April 7, 1964     C. G. HAMMOND ETAL     3,128,096
MOVING ANIMAL TARGET SYSTEM
Filed March 21, 1961     5 Sheets-Sheet 1

Clinton G. Hammond
Arthur J. Tickell, Jr.
INVENTORS

April 7, 1964  C. G. HAMMOND ETAL  3,128,096
MOVING ANIMAL TARGET SYSTEM

Filed March 21, 1961  5 Sheets-Sheet 2

Clinton G. Hammond
Arthur J. Tickell, Jr.
INVENTORS

BY *Clarence A. O'Brien*
*and Harvey B. Jacobson*
Attorneys

April 7, 1964  C. G. HAMMOND ETAL  3,128,096
MOVING ANIMAL TARGET SYSTEM

Filed March 21, 1961  5 Sheets-Sheet 3

Clinton G. Hammond
Arthur J. Tickell, Jr.
INVENTORS

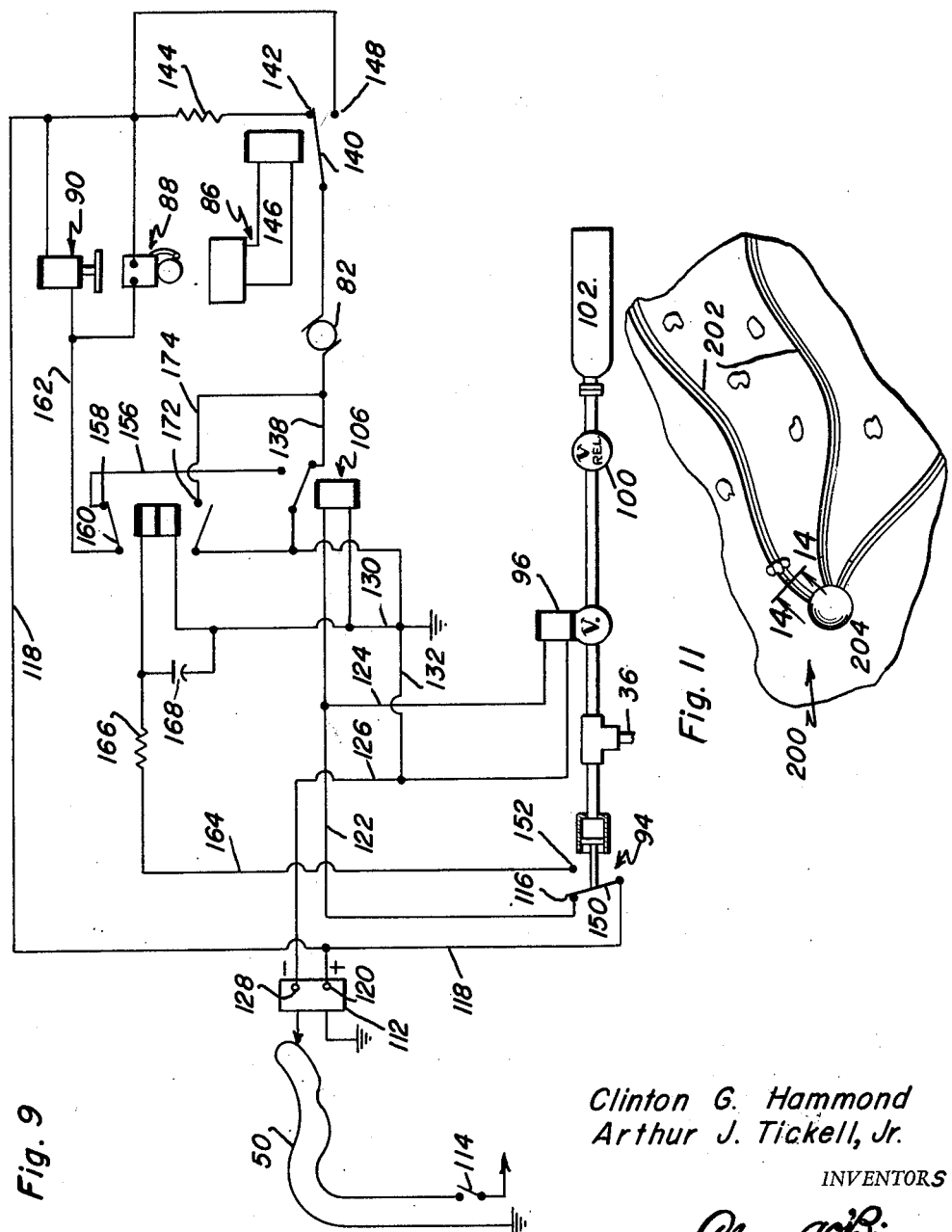

April 7, 1964  C. G. HAMMOND ETAL  3,128,096
MOVING ANIMAL TARGET SYSTEM
Filed March 21, 1961  5 Sheets-Sheet 5

Clinton G. Hammond
Arthur J. Tickell, Jr.
INVENTORS

BY Clarence A. O'Brien
and Harvey B. Jacobson
Attorneys

3,128,096
MOVING ANIMAL TARGET SYSTEM
Clinton G. Hammond, 286 Harbor, and Arthur J. Tickell, Jr., Damascus Road, both of Branford, Conn.
Filed Mar. 21, 1961, Ser. No. 97,346
23 Claims. (Cl. 273—102.2)

This invention relates to a moving target system providing improved means for target practice and training of marksmen.

It is a primary object of this invention to provide a moving target system enabling practice with firearms or other projectile launching devices under conditions which are more likely to prevail when engaged in actual firing conditions for both hunting and military purposes.

Another object of this invention is to provide a moving target system providing a greater variation in target practice conditions and facilities.

More particularly, the moving target system of the present invention involves the propelling of a target figure along an irregular path at a predetermined speed, with the figure undergoing life-like action prior to the discharge of the rifle or the like and reacting to the firing of a rifle as would be expected of a live target so as to provide a marksman with a more realistic target situation.

A further object of this invention is to provide a moving target system in accordance with the foregoing objects which will speed up in response to the discharge of a rifle and if hit by the rifle projectile will temporarily stop and/or fall and then resume movement at an increased speed to the starting point for repair or replacement of the damaged portion of the target.

An additional object of this invention is to provide a moving target system in which the life-like functions thereof are accomplished by a control mechanism operative on the propelling mechanism for the target figure, which mechanism is safely located below ground.

An additional object of this invention is to provide a moving target system in which reaction of the target figure to firearm discharge is provided by a control mechanism which will speed up the movement of the target and will also cause the target to temporarily stop when it is hit at a vital location thereon at which time it may optionally issue an indicating signal of the hit. Also, the target may fall automatically when hit or under selective control. The target will subsequently resume movement to the starting station and the damaged part thereof replaced so that the target may be used once again. The target figure accordingly is made of a material which will not resist projectiles nor will expand when hit. However, a removable portion of the target figure will contain inflatable plastic devices which when punctured will operate a pressure switch whereby the control mechanism will be operative on the propelling drive to accomplish the aforementioned function of temporarily stopping, indicating a hit and then returning to the starting station. Another feature includes the automatic hurling of a miss indicating spray at the firing station should the target approach the firing station without being hit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 9 is a circuit diagram of the control mechanism and associated components of the target system.

FIGURE 11 is a partial plan view of another target area.

Figure 1:
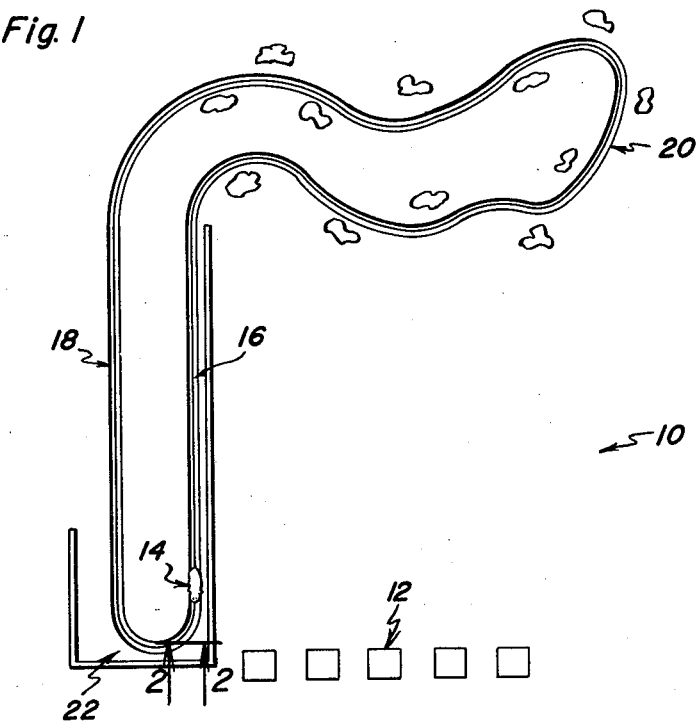
FIGURE 1 is a top plan view of a target area within which the moving target system of the present invention is installed.

Referring now to the drawings in detail, it will be observed in FIGURE 1 that one form of target system is illustrated including a target area within which the moving target system of the present invention is installed is generally referred to by reference numeral 10. The firing stations are designated by reference numeral 12 which firing stations are located in relation to a continuous path for a moving target figure generally referred to by reference numeral 14. The path through which the target figure moves includes a head-on approach portion 16 and a retreat portion 18 which portions are interconnected by a wavy and irregular portion 20. The portions 16 and 18 are interconnected at the starting station 22 located adjacent to the firing position 12. The irregular wavy portion 20 on the other hand, is located remote from the firing station 12 and proceeds through a relatively wooded area containing shrubbery, trees, etc., as indicated by reference numeral 24. The path indicated in FIGURE 1 will therefore provide the marksman with different types of moving target situations as far as the location of the moving target with respect to the firing position is concerned.

Figure 2:
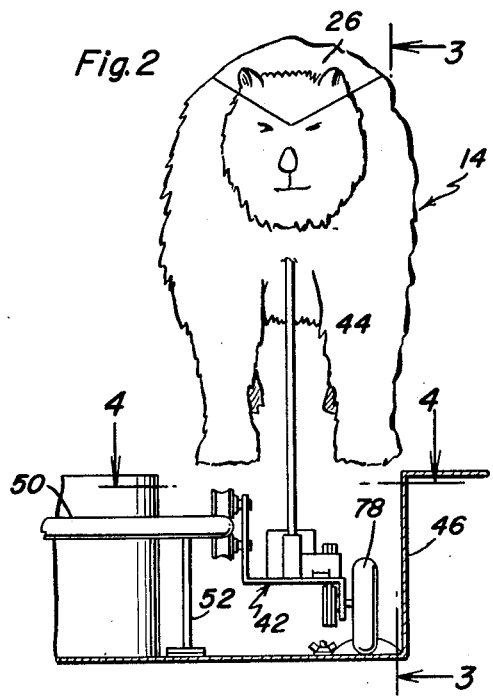
FIGURE 2 is a sectional view taken through a plane indicated by section line 2—2 of FIGURE 1 including a front elevational view of the target figure.
Figure 10:
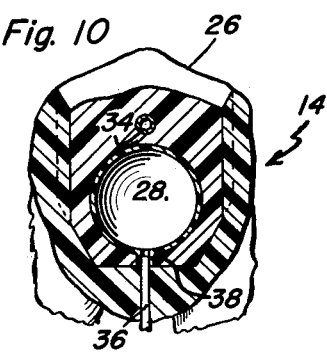
FIGURE 10 is a sectional view taken through a plane indicated by section line 10—10 in FIGURE 3.
Figure 3:
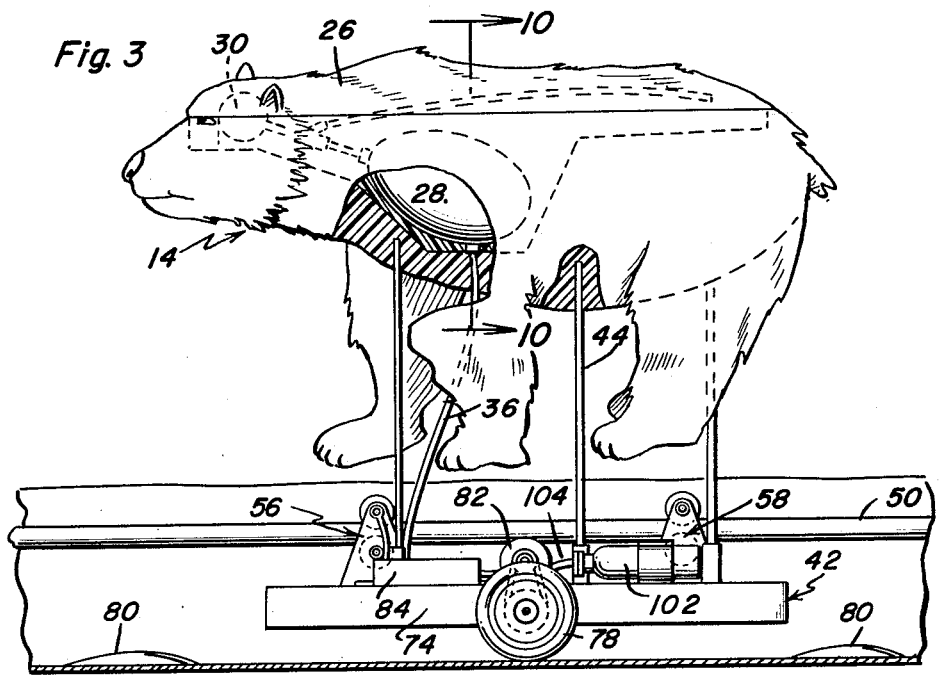
FIGURE 3 is a sectional view taken through a plane indicated by section line 3—3 in FIGURE 2.
Figures 7, 8:
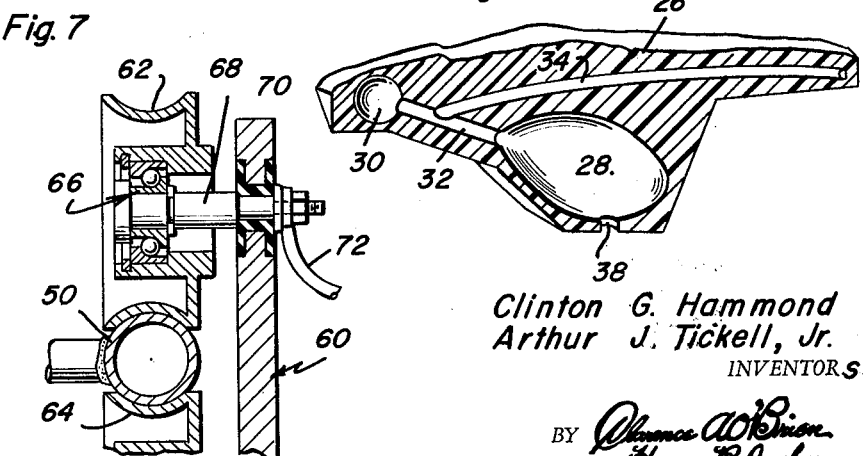
FIGURE 7 is a partial sectional view taken through a plane indicated by section line 7—7 in FIGURE 4.
FIGURE 8 is a respective view of the section of the removable portion of the target figure.
Figure 14:
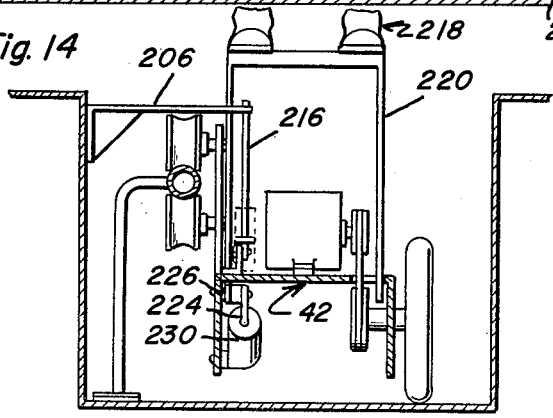
FIGURE 14 is a partial sectional view taken along a plane indicated by section line 14—14 in FIGURE 11.

Referring now to FIGURES 2 and 3 in particular, the target figure 14 will be more clearly seen. The target figure is illustrated in this form of the invention as a three dimensional animal figure such as a bear and is made of such material that a bullet or projectile may pass therethrough without causing the material to expand and with the material offering no resistance to the passage of the missile therethrough. Accordingly, the target figure 14 will not collapse as a result of being hit by a firearm missile. However, the figure includes a removable portion 26 within which there are contained cavities as more clearly seen in FIGURE 8 which receive inflatable plastic devices which form fluid tight chambers that may be punctured by passage of a missile therethrough. There is accordingly provided an inflatable chamber device 28 interconnected by plastic tube 32 with an inflatable plastic device 30 with the tube being connected to the plastic tube 34. The plastic chamber devices and tubes which are interconnected with each other for simultaneous inflation, are so dimensioned and shaped in proportion to the whole animal figure and relatively located so as to correspond to the vital organs of the animal represented by the target figure. For example, the chamber device 28 represents the heart of the bear-like figure 14, the chamber 30 represents the brain while the plastic tube 34 represents the spine. The chambers 28 and 30 which are interconnected with the tubes 32 and 34 will be in fluid tight communication with the control mechanism through a tubular conduit 36 which is fixedly mounted within the main portion of the figure 14 and extends downwardly therefrom. When the replaceable portion 26 of the figure is installed, the upper end of the conduit 36 is received within the inlet aperture 38 in the chamber 28.

Figure 5:
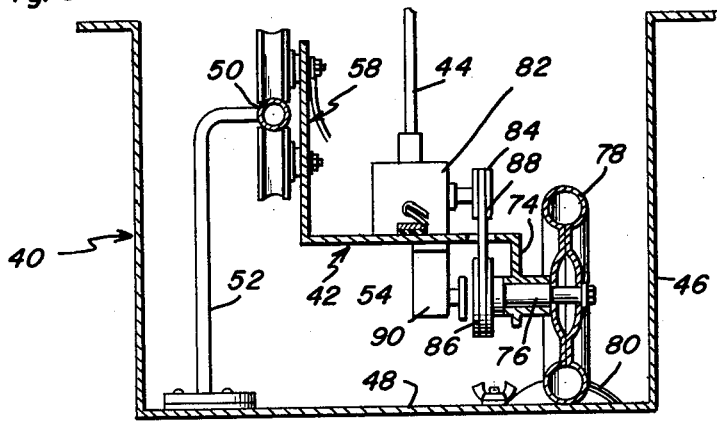
FIGURE 5 is a sectional view taken through a plane indicated by section line 5—5 in FIGURE 4.

In order to propel the figure 14 along the path as indicated in FIGURE 1, there is provided a track mechanism generally referred to by reference numeral 40 as shown in cross-section in FIGURE 5 which track mechanism supports therewithin a carriage device generally referred to by reference numeral 42 which carriage device 42 resiliently mounts the target figure 14. It will be observed that the track mechanism 40 is arranged with respect to the surface of the ground so that the propelling mechanism for the target figure is disposed entirely below ground level. The target figure is therefore mounted in spaced relation above the carriage device 42 so that the figure itself will be just above the ground. It will also be observed that the figure 14 is mounted on the carriage device 42 by a plurality of flexible whip members 44 whereby the figure 14 may bounce, sway or vibrate with respect to the carriage device 42 on which it is mounted. The figure will accordingly be moved along its path with a life-like action by virtue of its flexible mounting on the carriage device 42.

The track mechanism 40 is therefore disposed along the path illustrated in FIGURE 1 and as more clearly seen in FIGURE 5 includes a channel member 46 embedded in the ground. The bottom 48 of the channel member 46 mounts in spaced relation thereabove a continuous rail member 50 which may be connected to spaced supporting members 52 of any suitable type. The rail member 50 is provided for the purpose of suspending therefrom the carriage device 42 and may also be utilized as an electrical conductor for propelling the carriage by connecting the rail member 50 to a source of electrical current as will be described hereafter in further detail.

The carriage device 42 accordingly includes a horizontal portion 54 on which there is mounted the propelling and control equipment. One side of the horizontal portion 54 of the carriage device has connected thereto a pair of roller assemblies 56 and 58 by means of which the carriage device 42 is suspended from the rail member 50. Each of the roller assemblies include therefor an upstanding plate member 60 which rotatably mounts in vertically spaced relation to each other a pair of roller members 62 and 64 which rollingly engage the rail member 50 as more clearly seen in FIGURE 7. The roller member 62 is accordingly rotatably mounted by the ball bearing assembly 66 on the shaft member 68 received through a non-conductive bearing member 70 in the plate 60. It will therefore be apparent that electric current may be conducted through the rail member 50 to the electrical cable member 72 connected to the shaft 68 which is insulated from the plate 60. Also, it will be appreciated that the track mechanism and carriage device 42 will be grounded and insulated from the live electrically conducting rail member 50.

The side of the portion 54 of the carriage device 42 opposite the roller assembly, is connected to a depending skirt portion 74 through which the shaft 76 is journalled for connection to the traction wheel 78. The traction wheel rides on the bottom portion 48 of the channel member 46 and is intermittently engaged by displacing or bump elements 80 capable of being non-uniformly spaced in the path thereof. It will therefore be apparent, that as the carriage device 42 is propelled along the rails 50 by rotation of the traction member 78, it will be intermittently vibrated when the traction member 78 engages the bump elements 80 so as to impart to the target figure 14 mounted on the carriage device, a vibratory swaying motion for simulating the variable bouncing movement of a moving animal in accordance with any desired variation in degree of terrain irregularity being simulated.

Figure 4:
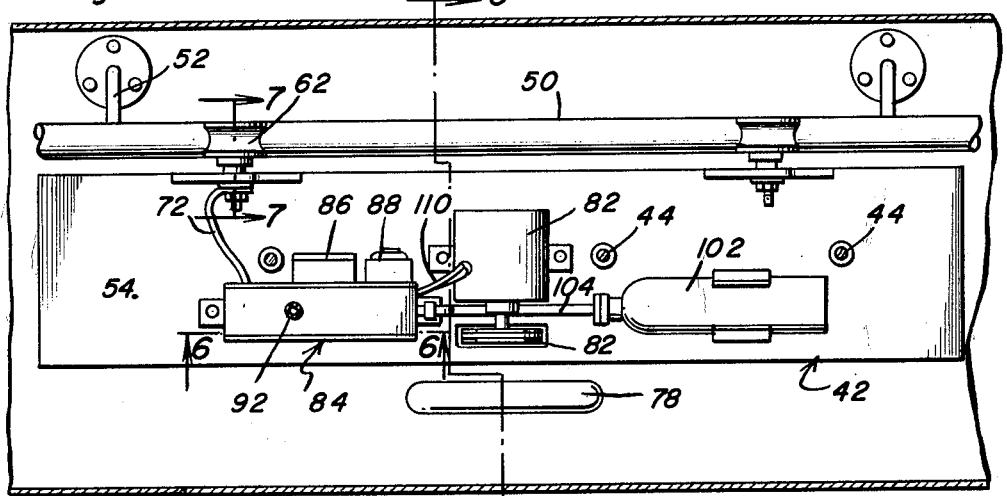
FIGURE 4 is a sectional view taken substantially through a plane indicated by section line 4—4 of FIGURE 2.

Referring now to FIGURES 3, 4 and 5, it will be observed that the traction member 78 is powered by means of an electric motor 82 mounted centrally of the carriage device 42 which motor 82 is connected to a pulley wheel 84 which pulley wheel 84 is aligned with pulley wheel 86 connected to the shaft 76 on which the traction wheel 78 is mounted. An endless drive belt 88 is therefore entrained about the pulley wheels 84 and 86 for the purpose of imparting rotation to the traction wheel 78 when the electric motor 82 is energized. Control over the motor is provided by means of a control mechanism generally referred to by reference numeral 84 which is mounted on the carriage device 42 adjacent to the motor 82 as more clearly seen in FIGURE 4. The power cable 72 is accordingly connected to the control mechanism 84 in order to control the energization of the motor 82.

Figure 6:
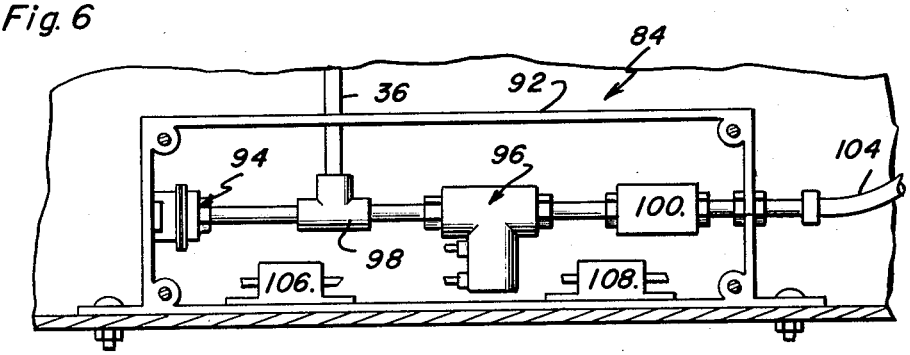
FIGURE 6 is a partial sectional view taken through a plane indicated by section line 6—6 in FIGURE 4.

It will also be observed in FIGURE 4, that the carriage device mounts a sound responsive mechanism 86 which may be of any type capable of responding to a noise level corresponding to the discharge of a firearm within the target area 10 so as to operate through the control mechanism 84 for controlling the motor 82. Also, the carriage device mounts a signal indicating device 88 of any suitable type such as an alarm bell which will be rendered operative when a vital organ part of the target is hit. The carriage device also mounts as seen for example in FIGURE 5, a brake device 90 which may be arranged to engage the pulley wheel 86 for stopping the traction wheel when the motor 82 is de-energized in order to prevent coasting of the moving target. The control mechanism 84 which is encased within the housing 92 includes as more clearly seen in FIGURE 6, a pressure-responsive switch device 94 and a solenoid operated valve mechanism 96 which are interconnected by the T-coupling 98 to the conduit 36 in order to provide fluid communication between the inflatable chamber devices located within the removable portion 26 of the target figure and the pressure switch device 94. Also, the solenoid operated valve mechanism 96 which is operatively connected to the conduit 36 by the T-coupling 98 controls the admission of fluid under pressure to the inflatable chamber devices within the target figure and is accordingly connected through a pressure regulator device 100 to a source of fluid pressure 102 by means of the conduit 104. The pressure source 102 as more clearly seen in FIGURE 4 may be a compressed air cylinder removably anchored to the carriage device. Also, mounted within the housing 92 of the control mechanism is a motor control relay device 106 and a time delay relay device 108. The relay devices 106 and 108 will therefore be electrically connected to the source of current by the cable 72 and will also be properly connected to the solenoid valve mechanism 96 as well as to the signal device 88 and the motor 82 through the cables 110.

Referring now to FIGURE 9, the operative relationships between the aforementioned components of the control mechanism 84 will be described. It will be observed in FIGURE 9, that the power for energizing the propelling motor 82 is obtained from a source 112 on the carriage device which source 112 may be a battery or as illustrated a device which is electrically coupled to the rail member 50 having a selectively controlled switch device 114 for connecting the rail member 50 to a source of current. If the current source to which the rail member 50 is connected is A.C., the device 112 may include the appropriate transformer, rectifier and filter circuits inasmuch as the control mechanism and propelling motor 82 as illustrated operate on D.C. current. It will however be appreciated that other control mechanism operating in accordance with the instructive principles of this invention may be resorted to. Also, self-contained propelling drive motors such as internal combustion engines may be used. Control over such latter type of propelling drives will however be exercised in accordance with this invention.

When the target figure is moving prior to firing, it will be appreciated that the plastic organ chambers 28, 30 and tube 34 which are interconnected to each other are supplied with fluid under pressure by the fluid source 102 through the regulator valve 100 and the solenoid operated valve mechanism 96. The pressure simultaneously is applied to the pressure switch device 94 so as to cause the switch element 150 to engage the terminal 116 thereof. The solenoid actuated valve device 96 maintains the valve connection open under such conditions inasmuch as a circuit is closed through the solenoid portion of the valve mechanism 96 by means of the line 118 connected to the positive terminal 120 of the power source 112 which is connected to the terminal 116 by the switch device 94 which terminal 116 is connected by lines 122 and 124 to one terminal of the solenoid valve mechanism, the other terminal being connected by the line 126 to the negative terminal 128 of the power source 112. Also connected in parallel with the solenoid valve device 96 is the motor control relay device 106 one terminal of which is connected to the line 122 while the other terminal thereof is connected by lines 130 and 132 to the line 126 so that the relay device 106 will also be energized and thereby cause the switch element 134 to contact terminal 136 connecting the conductor 132 by the line 138 to one terminal of the propelling motor 82. Conductor 132 being connected to the negative terminal 128 of the power source will therefore close a circuit to the motor 82 inasmuch as the other terminal of the motor is connected by the switch element 140 to the conductor 118 and the positive terminal 120 of the power source. The latter connection is however effected through the switch terminal 142 and the low speed resistor 144. Continuous operation of the motor 82 at its lower predetermined speed will therefore occur as long as the source of pressure is connected through the energized solenoid valve mechanism 96 to the inflatable chamber devices at the pressure switch device 94.

Should a firearm be discharged within the target area, the sound responsive device 86 will be then operative through relay 146 to move the switch element 140 into contact with contact element 148 whereby the motor circuit will by-pass the low speed resistor element 144 and thereby increase the speed of the motor and movement of the target. The control mechanism will otherwise not be effected. However, if the firearm discharge is accompanied by a projectile which punctures one of the plastic chamber devices or plastic tube elements in the target figure, there will be a reduction in fluid pressure effected in the conduit 36 and the fluid pressure switch device 94 so that the switch element 150 thereof moves out of contact with the element 116 and into contact with the contact element 152. Accordingly, both the solenoid valve mechanism 96 and the relay device 106 are deenergized in view of the interruption of the circuits thereto. The switch element 134 of the relay device 106 then moves out of contact with the element 136 into contact with the element 154 resulting in the opening of the circuit to the motor 82. The motor will accordingly be deenergized. However, the condutor 132 which is connected through conductor 126 to the negative terminal of the power source will be connected by the switch element 134 and contact 154 to both the solenoid actuated brake device 90 and the signal indicating device 88. The contact element 154 is accordingly connected by the conductor 156 to contact element 158, switch element 160 and conductor 162 to one terminal of both the brake device 90 and signal indicating device 88 the other terminals of which are connected to the positive terminal 120 by the conductor 118. It will therefore be apparent, that simultaneous with deenergization of the propelling motor 82, immediate stoppage of the carriage will be effected by a brake 90 and an indicating signal provided.

Under the aforementioned conditions, occurring upon puncture of the plastic inflatable chamber devices, the deenergized solenoid valve mechanism 96 will be operative to disconnect the fluid conduit from the regulator valve 100 to both the punctured inflatable devices and pressure switch device 94, and thereby maintain the pressure available for use thereafter. It will also be observed, that under such conditions, the positive terminal of the supply source will be connected by the switch element 150 to the contact element 152 and conductor 164 and through a timing resistor 166 to one terminal of the relay of the time delay relay device 108. The other terminal of the relay is connected to the conductor 130 which is in turn connected to the conductors 132 and 126 to the negative terminal of the supply source 112 to thereby close a circuit through the relay device 108. However, connected in parallel across the relay terminals, is the timing capacitor 168 which will prevent energization of the relay for a predetermined period of time. After elapse of the predetermined time interval, the relay will be energized so as to move the switch element 160 out of contact with the contact element 158 and cause the switch element 170 to contact the elements 152 and thereby electrically connect the conductor 132 by the line 174 to the propelling motor 82. Accordingly, the motor circuit will be closed by means of the switch element 170 so that movement of the target figure may be resumed. The relay device 106 and solenoid valve mechanism 96 will however remain de-energized until the target assembly is returned to the target station and the replaceable portion 26 of the target removed and replaced by a new portion which is fluid tight. Accordingly, when the inflatable devices are pressurized once again, the pressure switch device 94 will then be positioned with the switch element 150 thereof in contact with the element 116 so as to energize the solenoid valve mechanism 96 and relay device 106 and deenergize the time delay relay device 108.

From the foregoing description, operation and utility of the target system of the present invention will be apparent. The target will therefore move along a continuous track including movement through a wooded area in a wavy and irregular path as well as along a head-on approach portion and a retreat portion. The target will move at a predetermined low speed until the firearm is discharged at which time its speed will be increased. Should the discharge of the firearm cause puncture of the target at a vital organ location, the target will stop for a predetermined period of time by virtue of the deenergization of the motor 82 and the engagement of the brake device 90 and will at the same time put out a signal indicating a hit, through the signal indicating device 88. It will also be apparent, that the fluid supply to the part of the target punctured will be shut-off by closing of the deenergized solenoid valve 96 so as to maintain the pressure supply of cylinder 102. The pressure switch which also has been actuated to its other position will close the circuit through the time delay solenoid device 108 which will after a predetermined time interval close a circuit through the motor for operation thereof at its higher speed in order to return the target to the starting station for repair and replacement purposes.

FIGURES 11 through 14 illustrate another form of target system made in accordance with the present invention. As shown in FIGURE 11, the target area 200 includes a plurality of wavy tracks 202 which approach a foxhole or similar firing station 204 provided for military training purposes. A plurality of moving targets may therefore be provided for each of the respective paths 202 which will approach the rifleman at the firing station 204. The target moving along each of the paths 202 will be operated in a manner similar to that disclosed with respect to FIGURES 1 through 10 and in addition will include a weapon in the form of a catapult or hurling device which will hurl a miss indicating spray onto the firing station 204 as it is approached, if the target figure has not been hit at a vital organ location.

Figure 13:
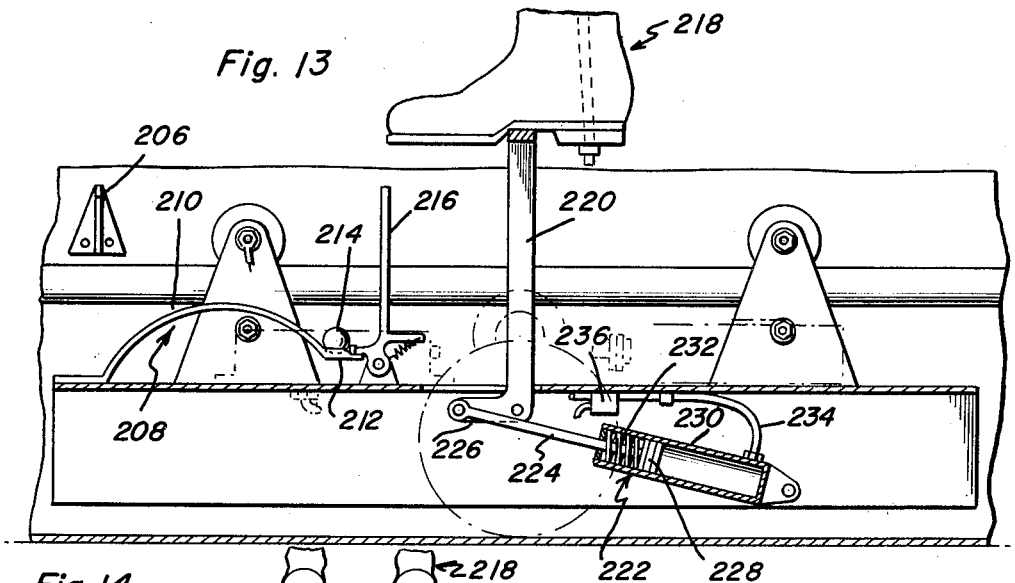
FIGURE 13 is a partial sectional view taken substantially along a plane indicated by section line 13—13 in FIGURE 12.

Referring therefore to FIGURE 14, it will be observed that the target figure 218 which is resiliently mounted on the same type of carriage 42 as described with respect to FIGURES 1 through 10, is engaged by a projecting trigger release arm 206 which extends from the side of the track below the surface of the ground for purposes of releasing a catapult or hurling device generally referred to by reference numeral 208 as more clearly seen in FIGURE 13. The hurling device 208 accordingly includes a tension spring member 210 which is firmly anchored at the forward end of the carriage with the rear end 212 holding a miss indicating missile 214 which when hurled by the device 208 will rupture and spray a tell-tale powder over the foxhole firing station 204 so as to cover the rifleman therewith and thereby embarrassingly mark the rifleman as failing to fatally hit the moving target. Release of the tension spring member 210 is accordingly accomplished by engagement of the projecting arm 206 adjacent to the firing station end of the paths 202, with a latch device 216 which is pivotally mounted on the carriage and biased into engagement with the rear end 212 of the device 208 for holding it in the firing position as illustrated in FIGURE 13. It will therefore be apparent, that when the latch device 216 is engaged by the arm 206 it will release the device 208 in order to fire the miss indicating powder spray container 214.

Figure 12:
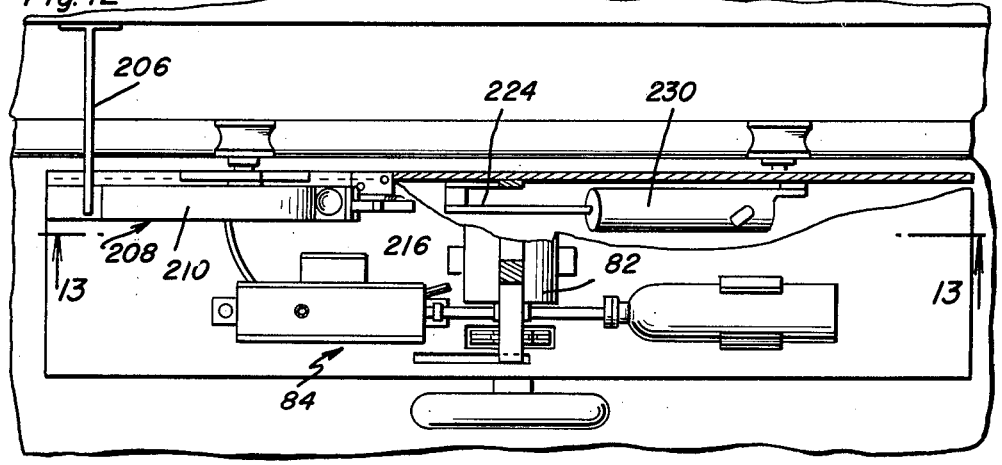
FIGURE 12 is a partial top plan sectional view of a modified form of target propelling mechanism.

The target figure 218 in the modified form of the invention as illustrated in FIGURES 12 through 14, may represent the figure of an enemy soldier pivotally mounted on the carriage by a pair of resilient members 220 which are interconnected in straddling relation to the propelling motor 82 and drive pulleys and pivotally mounted by the carriage 42. A target figure positioning mechanism generally referred to by reference numeral 222 is therefore provided including a piston rod member 224 which is pivotally connected to an arm 226 projecting forwardly from one of the mounting members 220. The piston rod 224 is connected to a piston 228 slidably mounted within a cylinder 230 which is spring biased to one position by spring member 232 which tends to position the target figure 218 toward a horizontal position. The target figure 218 is however maintained erect by supply of fluid under pressure to one end of the cylinder 230 by means of the conduit 234 which is connected to the supply conduit 36 as described with respect to FIGURES 1 through 10 for supplying fluid under pressure to the vital organ inflation chambers of the target figure. The target figure 218 will accordingly be provided with similar organ simulating inflation chambers. It will therefore be appreciated that when one of the vital organs of the figure 218 is punctured, not only will the control mechanism 84 cause the propelling carriage 42 to stop but will also release the pressure in the cylinder device 230 so that the spring 232 thereof will cause the target figure 218 to move or fall to a horizontal position.

From FIGURE 13, it will be observed that the fluid conduit connection 234 which is connected to the supply conduit 36 for inflating the chamber devices within the target figure, includes a valve mechanism device 236 interposed therein for the purpose of effecting fluid venting of the cylinder device 230 prior to puncture of the target at a vital organ location. The valve mechanism device 236 will accordingly disconnect the conduit 234 from its connection to the conduit 236 and will vent only that portion thereof which is connected to the cylinder 230. The valve mechanism 236 may therefore be controlled to effect premature venting of the cylinder 230 by any suitable remote control and by a timing mechanism intermittently operative to cause the target figure 218 to fall and rise. It will therefore be appreciated, that the control mechanism 84 utilized in connection with the target figure 18 will be modified from that described with respect to FIGURES 1 through 10 in that the target when hit will instead of resuming movement in the same direction, reverse its direction for return to the starting point of its path 202. Accordingly, the switch element 160 as described in FIGURE 9 will be modified so as to close a circuit through the propelling motor 82 with the polarity thereof reversed. It will also be apparent that the control mechanism provided for the target figure 218 may have the hit indicating mechanism 88 removed therefrom. Otherwise, the target system as described with respect to the target figure 218 will be operative in the same manner as described with respect to the target figure 14. The catapult device 208 is added however for hurling the miss indicating spray packet 214 as heretofore indicated. It should also be appreciated that other suitable miss indicating mechanism may be utilized pursuant to the aforementioned principles and functional relationships.

The target system of the present invention will therefore include several significant and highly desirable features. For example, it will respond differentially to target firing by speeding up under all conditions and stopping only when hit at a vital organ location requiring marksmen to aim for and hit the vital organs of the target. Also, it will be propelled by a propelling mechanism located below the ground and controlled by a self-contained control system. The replaceable mounting for the puncture responsive organ devices are also made readily accessible for repair or replacement purposes. Finally, by providing an irregular path, an intermittently falling target figure and the miss indicating spraying device, the target system will be of appreciable value as a training aid for military purposes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A moving target system, comprising target figure means, propelling means operatively connected to the figure means for movement thereof with life-like action along a prescribed path within a target area and at a predetermined speed, and reaction control means operatively connected to the propelling means and the figure means operative in response to release of sound energy by the discharge of a missile within the target area to instantaneously change the movement of the figure means simulating expected reaction of a moving live target to missile discharge.

2. The combination of claim 1, wherein said figure means is three dimensional and includes a replaceable portion containing puncture responsive means having interconnected fluid pressure inflatable chamber means.

3. The combination of claim 2, wherein said propelling means includes track means, carriage means supported by the track means and movable therealong, flexible mounting means connected to the carriage means and the figure means for support thereof in spaced relation above the carriage means, power drive means mounted on the carriage means and operatively engageable with the track means for controlled movement therealong and displacing means mounted in the track means for intermittent vibration of the carriage means and figure means flexibly mounted thereon in response to movement of the carriage means.

4. The combination of claim 3, wherein said track means includes rail means supporting the carriage means suspended therebelow and a bottom traction portion mounting said displacing means and operatively engageable with said power drive means.

5. The combination of claim 4, wherein said reaction control means includes sound sensing means responsive to discharge of the missile for instantaneously increasing the speed of the propelling means above said predetermined speed.

6. The combination of claim 5, wherein said reaction control means is operatively connected to said puncture responsive means operative upon puncture of the figure means at predetermined locations thereon by the missile, to provide an indicating signal and stop movement of the figure means for a predetermined interval after which movement is resumed.

7. A moving target system, comprising target figure means, propelling means operatively connected to the figure means for movement thereof with life-like action along a prescribed path within a target area and at a predetermined speed, reaction control means operatively connected to the propelling means and the figure means operative in response to release of sound energy by the discharge of a missile within the target area to instantaneously change the movement of the figure means simulating expected reaction of a moving live target to missile discharge, said figure means being three dimensional and including a replaceable portion containing punture responsive means having interconnected fluid pressure inflatable chamber means, said propelling means including sub-surface track means, carriage means supported by the track means and movable therealong, flexible mounting means connected to the carriage means and the figure means for support thereof in spaced relation above the carriage means, power drive means mounted on the carriage means and operatively engageable with the track means for controlled movement therealong, and bump means mounted on the track means for intermittent vibration of the carriage means and figure means flexibly mounted thereon in response to movement of the carriage means, said track means including rail means supporting the carriage means suspended therebelow and a bottom traction portion mounting said bump means and operatively engageable with said power drive means, said reaction control means including sound sensing means responsive to discharge of the missile for instantaneously increasing the speed of the propelling means above said predetermined speed, said reaction control means being operatively connected to said puncture responsive means and operative upon puncture of the figure means at predetermined locations thereon by the missile, to provide an indicating signal and stop movement of the figure means for a predetermined interval after which movement is resumed, said puncture responsive means further including fluid pressure means operatively connected to the inflatable chamber means for inflation thereof, drive control means operatively connected to the chamber means and actuated in response to reduction of pressure in the chamber means after puncture thereof by a missile and means responsive to actuation of the drive control means to disconnect the fluid pressure means from the chamber means.

8. The combination of claim 7, wherein said drive control means includes motor stop means operatively connected to the power drive means for stopping operation thereof when actuated, signal indicating means operative simultaneous with the actuation of the motor stop means, sound responsive means operatively connected to the power drive means for increasing the speed thereof in response to a predetermined noise level, and time delay means operatively connected to the motor stop means for restoring operation of the power drive means.

9. The combination of claim 1, wherein said propelling means includes track means, carriage means supported by the track means and movable therealong, flexible mounting means connected to the carriage means and the figure means for support thereof in spaced relation above the carriage means, power drive means mounted on the carriage means and operatively engageable with the track means for controlled movement therealong and displacing means mounted in the track means for intermittent vibration of the carriage means and figure means in response to movement of the carriage means.

10. The combination of claim 1, wherein said reaction control means includes, sound sensing means responsive to discharge of the firearm for instantaneously increasing the speed of the propelling means above said predetermined speed.

11. The combination of claim 1, wherein said reaction control means includes means responsive to puncture of the figure means at predetermined locations thereon by a missile discharged from the firearm, to provide an indicating signal and stop movement of the figure means for a predetermined interval after which movement is resumed.

12. The combination of claim 11, wherein said figure means includes a replaceable portion containing puncture responsive chamber means collapsible when punctured to establish a fluid pressure signal.

13. A moving target system comprising, target figure means, propelling means operatively connected to the figure means for movement thereof with life-like action along a prescribed path within a target area and at a predetermined speed, and the reaction control means operatively connected to the propelling means and the figure means operative in response to release of sound energy by the discharge of a missile within the target area to instantaneously change the movement of the figure means simulating expected reaction of a moving live target to missile discharge, said reaction control means including means responsive to puncture of the figure means at predetermined locations thereon by a missile discharge from the firearm to provide an indicating signal and stop movement of the figure means for a predetermined interval after which movement is resumed, said figure means including a replaceable portion containing puncture responsive chamber means collapsible when punctured to establish a fluid pressure signal, said puncture responsive means including fluid pressure means operatively connected to the chamber means for inflation thereof, drive control means operatively connected to the chamber means and actuated in response to reduction of pressure in the chamber means after puncture thereof by a missile and means responsive to actuation of the drive control means to disconnect the fluid pressure means from the chamber means.

14. A moving target system, comprising target figure means, propelling means operatively connected to the figure means for movement thereof along a prescribed path within a target area and at a predetermined speed, and reaction control means operatively connected to the propelling means and the figure means operative in response to release of sound energy by discharge of a firearm within the target area to instantaneously change the movement of the figure means simulating reaction to firearm discharge of a moving live target whether hit or not, said reaction control means including motor stop means operatively connected to said propelling means for stopping operation thereof when actuated in response to missile puncture of the figure means, signal indicating means operative simultaneous with the actuation of the motor stop means, sound responsive means operatively connected to the propelling means for instantaneously increasing the speed thereof in response to a predetermined noise level, and time delay means operatively connected to the motor stop means for restoring operation of the propelling means a predetermined interval following actuating of the stop means.

15. A moving target system, comprising target figure means, propelling means operatively connected to the figure means for movement thereof along a prescribed path within a target area and at a predetermined speed, and reaction control means operatively connected to the propelling means and the figure means including means responsive to puncture of the figure means only at predetermined locations thereon to temporarily stop operation of the propelling means and means responsive to firearm discharge noise within the target area for instantaneously increasing the speed of the figure means when the propelling means is in operation.

16. The combination of claim 1, wherein said prescribed path includes head-on approach and retreat portions with respect to designated firing stations to vary target distance in depth.

17. The combination of claim 1, including miss indicating means operatively connected to the propelling means for hurling a miss indicating spray from the head-on approach portions of the figure means on the prescribed path.

18. The combination of claim 1, including figure position control means operatively connected to the propelling means and automatically operative in response to puncture of the figure means only at predetermined locations thereon to move the figure means to a horizontal position relative to the propelling means.

19. The combination of claim 18, including selectively operated control means operatively connected to the figure position control means moving the figure means to the horizontal position prior to puncture thereof.

20. In a target practice system, a target, means to move said target to a predetermined location, a weapon carried by said target, means for preventing said target from arriving at said predetermined location under certain conditions, and means for causing said weapon to discharge in response to arrival thereof at said predetermined location, said means for preventing comprising, puncture responsive means operatively connected to the target moving means to temporarily stop and then reverse movement of the target in response to puncture thereof and means operative when the target is stopped to displace the target from an erect position to a horizontal position.

21. The combination of claim 20 including reaction control means operatively connected to the target moving means for more rapidly moving the target to said predetermined location in response to the discharge sound of a firearm.

22. In a target practice system, a target, means to move said target to a predetermined location, a weapon carried by said target, means for preventing said target from arriving at said predetermined location under certain conditions, means for causing said weapon to discharge in response to arrival thereof at said predetermined location, and reaction control means operatively connected to the target moving means for more rapidly moving the target to said predetermined location in response to the discharge sound of a firearm.

23. In a moving target system, target propelling means for moving a target along a prescribed path between spaced locations at a predetermined speed and direction, reaction means operatively connected to the propelling means for instantaneously changing the speed of the target in response to discharge of a firearm in the vicinity of the target, and puncture responsive means operatively connected to the propelling means for changing the direction of movement of the target in response to puncture thereof.

References Cited in the file of this patent

UNITED STATES PATENTS

| 1,072,298 | Bates et al. | Sept. 2, 1913 |
| 1,927,876 | Meyer | Sept. 26, 1933 |
| 2,308,814 | Kenney et al. | Jan. 19, 1943 |
| 2,404,653 | Plebanek | July 23, 1946 |
| 2,726,870 | Auger | Dec. 13, 1955 |

FOREIGN PATENTS

| 57,036 | Austria | Dec. 10, 1913 |
| 419,646 | Great Britain | Nov. 15, 1934 |